United States Patent
Johnson

[11] Patent Number: 5,297,334
[45] Date of Patent: Mar. 29, 1994

[54] AUTOMATED WIRE FEEDING AND RESTRAINING

[75] Inventor: Michael J. Johnson, El Paso, Tex.

[73] Assignee: Chrysler Corporation, Highland Park, Mich.

[21] Appl. No.: 993,545

[22] Filed: Dec. 21, 1992

[51] Int. Cl.$^5$ ............................................. H01R 43/04
[52] U.S. Cl. ..................................... 29/861; 29/33 M; 29/863; 49/167; 49/502; 174/72 A; 296/70
[58] Field of Search ............... 174/72 A; 49/167, 502; 29/861, 33 M, 863; 296/70

[56] References Cited

U.S. PATENT DOCUMENTS

| | | |
|---|---|---|
| 2,896,213 | 7/1959 | Alderman et al. |
| 3,710,480 | 1/1973 | Royse et al. |
| 3,956,822 | 5/1976 | Folk |
| 4,210,773 | 7/1980 | Haley et al. ............ 174/72 A |
| 4,271,573 | 6/1981 | von Roesgen |
| 4,461,061 | 7/1984 | Rock |
| 4,703,543 | 11/1987 | Aceti et al. |
| 4,824,164 | 4/1989 | Nakayama et al. ........ 174/72 A X |
| 5,092,647 | 3/1992 | Ueda et al. ............... 49/167 X |

FOREIGN PATENT DOCUMENTS

| | | |
|---|---|---|
| 1000821 | 11/1976 | Canada. |
| 3337596 | 4/1985 | Fed. Rep. of Germany. |
| 3609704 | 9/1987 | Fed. Rep. of Germany ... 174/72 A |
| 1403431 | 8/1975 | United Kingdom ............ 174/72 A |

Primary Examiner—Carl J. Arbes
Attorney, Agent, or Firm—Wendell K. Fredericks

[57] ABSTRACT

A method of feeding and restraining wire for a vehicle instrument panel includes feeding the wire into and restraining it in a system of troughs attached to a structure serving as a wiring board. Each trough has a floor and two substantially parallel side walls perpendicular to the floor and extending upwardly from the trough to an open ceiling. The system of troughs has at least two terminals disposed remotely from one another. Steps in the method include attaching one end of a first wire to a first terminal within a first trough, laying the first wire to trace the extension of the first trough, spraying the first wire at intervals with adhesive to attach the wire to the floor of the trough, cutting the first wire at the location of the second terminal, and attaching the wire to the second terminal.

18 Claims, 3 Drawing Sheets

AUTOMATED WIRE FEEDING AND RESTRAINING

CROSS REFERENCE TO RELATED APPLICATIONS

This application is related to U.S. application entitled "Modular Wiring System for Vehicle Instrument Panel Wire" filed Dec. 14, 1992, Ser. No. 07/989,868 also U.S. application entitled "Wiring System for Automotive Instrument Panel Wire Encapsulated in Reconfigured Ventilation System" filed Dec. 14, 1992, Ser. No. 07/989,867 and also to U.S. application entitled "Automated Feeding, Terminating and Cutting Device" filed Dec. 21, 1992, Ser. No. 07/993,543.

FIELD OF THE INVENTION

This invention relates generally to a wiring system for a vehicle instrument panel, and more particularly to a wire restraining system in which wires for electronic subassembly components for instruments displayed on a dashboard are restrained in a system of troughs. Still more particularly, this invention relates to a method of automatically feeding wire into a system in which it is restrained for easy installation on a vehicle instrument panel.

BACKGROUND OF THE INVENTION

A few years ago, the automotive industry began to reverse the trend, which it had begun almost twenty years before, of replacing dashboard gauges with small warning lights or so-called "idiot lights". In part this was due to the sophistication of electronic gauges. Electronics are now used in various subassembly components of the modern day vehicle instrument panel. Electronic modules are used as small on-board computers that monitor hundreds of inputs from various sensors on the vehicle. Many leads or wires are used to electrically convey information from sensors at the sources of the information to the electronic gauges, through relays monitored by the modules. Other electronic subassemblies, such as radios, message centers, power antennae relays, intermittent windshield wiper controls, electronic air conditioning switches and relays, and other subassembly components are also interconnected by leads and wiring to electrical sources and sensors.

Because of the sheer number of electrically conductive wires used to electronically connect the subassembly components to each other and to other vehicle electrical components, wiring harnesses are typically used to arrange the conductive wires in groups. The wiring harnesses are attached the instrument panel and routed along its substructure during assembly of the board or instrument panel. Wiring harnesses have the advantage of bringing some order to a spaghetti-like entanglement of wires, facilitating some tracing of the wires to allow for proper connections during assembly and to allow for trouble shooting such connections for repair.

While wiring harnesses have advantages over loose arrays of wires that are difficult to trace, wiring harnesses also have shortcomings. Manually attaching and routing the wiring harnesses is a tedious and labor intensive task. Furthermore, owing in part to the tediousness and labor intensiveness of the task, manual manipulation of the wiring harnesses during assembly often results in damage to the instrument panel, to the subassembly components, and to the wires themselves. Because of the number of subassembly components that must be electrically interconnected, it is of limited advantage to systematize the deployment of wires simply by restraining wires as is done by using wiring harnesses.

For example, bunching a number of wires in a wiring harness does not help in allowing work operations to be performed upon the ends of the wires. This shortcoming can be appreciated by considering the teaching of U.S. Pat. No. 3,956,822, issued to Folk on May, 18, 1976. Folk discloses a method and apparatus for positioning lengths of individual leads of a plurality of leads in spaced apart relationships with respect to one another, so that work operations can be simultaneously performed on the ends of the leads. The lengths of leads are positioned in a plurality of spaced apart grooves of a template by progressively positioning successive parts of the lengths of each of the plurality of leads into respective grooves. Each groove is wider and deeper than the lead positioned within the groove. Each of the grooves has one or more spaced-apart lead confining means that retain segments of the leads positioned in the groove. The template with its grooves are only employed to perform the work operations on the ends of the leads. When the work operations are complete, knockout pins are associated with each of the spaced apart lead retaining means to facilitate stripping the leads from the template. Accordingly, a wiring harness does not facilitate end operations of leads, such as the installation of terminals. As disclosed in the related U.S. patent application entitled "Wiring System for Automotive Instrument Panel Wire", cited in the Cross Reference to Related Applications section of this specification, a system of grooves or troughs as used in the present invention has advantages over both work templates and wiring harnesses.

Several devices have been disclosed as means for automatically feeding wires, cutting them and positioning them on wiring boards, thereby to eliminate the labor intensiveness of routing wires to electrical subassembly components to complete circuits. For one example, Alderman et al., in U.S. Pat. No. 2,896,213, disclose a machine for cutting, forming, and inserting the leads of lead bearing components in a workpiece. The machine has means provided for supporting a wiring board in a pre-determined position relative to operating instrumentalities mounted on the machine head. This relative positioning allows components to formed and applied with their leads extending to or through the wiring boards for suitable connection with circuitry on the mounting boards. The board is mounted on a pallet that is associated with a pair of conveyor belts to move the board into its position.

In U.S. Pat. No. 4,271,573, von Roesgen discloses a quick-connect interconnection system. By this system, all interconnections are performed on one side of a component-receiving board, using slotted-beam insulation-piercing connectors. Boards with or without metalization patterns are adapted to the basic approach. Using boards with an X-Y pattern of holes arranged in columns, slotted-beam connector elements are readily pressed into one side, and corresponding circuit elements, such as dual-in-line packs, plugged from the other side into the connector elements. The system is enhanced by a tool that feeds insulated conductors from a source and into selected slotted beams. The tool includes a retractable knife or a retractable cutter with which a given wire run may be terminated. For the manual mode, a sequence of wiring is indicated to an operator by stepping of a laser beam that illuminates slotted-beams to be interconnected.

Rock, in U.S. Pat. No. 4,461,061, teaches a method and apparatus for connecting wiring to insulation displaced-type, circuit board-mounted electrical contacts. The Rock method comprises automatic positioning and orientating of individual contacts relative to a wire insertion head. A portion of the wire is fed from a supply to the tip of a pusher which inserts this portion into fingers of the contact. Another contact is positioned and oriented relative to the pusher to receive a second portion of the wire and provide a wire run between the contacts. The wire run can be terminated at the last contact without repositioning the contact and pusher relative to each other, with the remaining supply wire being prepared for another insertion. The Rock device and method is similar to that of von Roesgen, and furthermore, Rock does not teach the use of troughs with restraining means.

Aceti et al., in U.S. Pat. No. 4,703,543, discloses a robotically operated wire insertion apparatus for insulation displacement terminals. The Aceti et al. system automatically feeds wire to a wire insertion hand. The apparatus automatically straightens the wire during the feeding so that the wire is aligned with the hand. The apparatus inserts the wire progressively into a plurality of insulation displacement terminals and severs the wire from the last inserted insulation displacement terminal. The apparatus is initialized to begin a new wiring circuit. The method and system as taught by Aceti et al. is adapted for insulation displacement terminals that have any orientation in any plane on one or more different substrates.

None of these systems, alone or in combination with others, teaches the advantages of the present invention. For example, except that the device disclosed by Alderman et al. is an automated machine for forming and applying leads to a wiring board, the device lacks the structure of a machine adapted for movement through a trough while laying wires as will be shown to be an advantage of the present invention. While the von Roesgen disclosure is relevant for its teaching of the quick-connect interconnection system, as will be seen to be an advantage of the present invention, the von Roesgen disclosure provides no teaching of the overall wiring system of the present invention, including the use troughs and a wire feeding method for laying wires in troughs, notwithstanding its teaching of a cutter with which a given wire run may be terminated. And while Aceti et al. teaches point-to-point wiring in different directions to different terminals, there is no teaching of the trough structure and means of restraint taught by the present invention.

OBJECTS OF THE INVENTION

Accordingly, it is an object of the present invention to provide an improved means of feeding and restraining wires in a wiring system that has advantages over both work templates, wiring harnesses and wiring boards.

It is another object of this invention to provide an improved method of feeding and restraining wires in a wiring system for a vehicle instrument panel that is capable of restraining a plurality of wires placed so that the wires are easily traceable for ease of assembly of subassembly components into the wiring system.

It is yet another object of this invention to provide an automated method of laying wires in troughs in a wiring system that restrains wires, while allowing them to be easily traced for diagnostic purposes and easily installed to electrically hook up the subassembly components of a vehicle instrument panel.

Yet still it is another object of this invention to provide an automated method of laying point-to-point wiring in different directions to different terminals disposed in troughs with a means of restraining the wires in the troughs.

SUMMARY OF THE INVENTION

The instrument panel assembly of a vehicle includes a dashboard structure and a plurality of electrical assembly components associated with the instrumentation displayed on the dashboard. The subassembly components include electrical and electronic instruments, components, and assemblies that are mounted on or in proximity to the board structure. The subassembly components are interconnected and connected to other electrical and electronic components by a plurality of wires that are physically secured to the instrument panel assembly in the manner of the present invention that functions as a wire restraining system.

Wires are routed within a series of channels or troughs that are formed in or on a supporting structure, such as a wiring board. Each trough is defined by a floor that extends along a longitudinal axis and two side walls that are spaced laterally and that extend perpendicularly to and outwardly from the floor. The "ceiling" of the trough, opposite the floor, is open.

Each trough may be traced along its longitudinal extent as it branches into other troughs or groups of troughs. Wires may be laid out to interconnect subassembly components as each trough opens into another trough or other troughs in which subassembly components are disposed. Each subassembly component is electrically attached to a connector, which is incorporated into the wiring system and which serves a mating portion for a subassembly component. The mating portion of each connector is typically oriented to a docking station associated with the instrument panel assembly.

Each trough may contain one or several wires or as many as two-hundred wires. The size of a trough, particularly the width, depends on the number of wires to be placed in the trough. Each wire is individually a connecting part of a wiring circuit and is placed individually in the trough. Most wires originate from a master connector, but wires also extend from a connector of one subassembly component to a connector of another. The wires are each attached to terminals that are preferably integral with the connectors.

Each wire is restrained within the trough by restraining means. One restraining means is a ledge or lip structure extending from each side wall. Another is an adhesive that is used to attach a wire to the floor of a trough. Yet another comprises pairs of flexible clips that are mounted over the opening to the trough in spaced relationship to other pairs of flexible clips along the extension of each trough. All of the wire restraining means may be used together to restrain wire within a trough or one or more means may be sufficient to accomplish the same.

A wire feeding device is used to place a single wire within a trough. The feeding device includes a housing to which various functional elements used in feeding and restraining wires and interacting with the wiring system may be attached. Wire is supplied from a spool of wire external to the feeding device. A trailing end of the wire is initially anchored at an originating terminal. The wire is then threaded through a wire feed tube mounted to the housing. As the feeding device traverses a path tracing selected ones of the troughs of the wiring system, the wire is continuously fed through the feeding device. The spool of wire may be changed to hold different types of wire, as required. Some types of wire may not slide as easily through the wire feed tube and may need the assistance of a motorized mechanism to unwind the spool to feed wire to the feeding device.

A clip separator or wedge is mounted to the housing and functions to separate flexible clips, providing access to trough for the feed tube. The wedge functions to move aside the flexible clips as it passes or "wedges" between them. Accordingly, each flexible clip is moved from a first position over the opening to trough where clip is bowed into engagement with or proximity to another opposingly bowed clip, to second position where the clip is flexed away from its engagement with or proximity to the other opposingly bowed clip. It is the flexibility of the clips that allows the wedge of the wire feeding device to pass freely between the clips. Once the wire has passed between opposing clips, having laid wire in a trough, the flexible clips return to their original unflexed posture and the wire is left restrained in trough by the clips. After the wire is under the flexible clips, the feeding device proceeds along a trough and then on to different branches of troughs.

As the wire is placed in the trough, a spray applicator applies adhesive to assist in securing the wire in the trough. The spray applicator includes a pumping mechanism, a spray nozzle, a hose for supplying adhesive 44 to the applicator housing, and a nozzle. The applicator housing is mounted externally to the feeding device, and the mechanism within it selectively pumps adhesive through the nozzle. The nozzle is spaced from the floor of the trough. The adhesive that the spray applicator applies is preferably a hot melt glue. The glue is pumped through the hose to the spray nozzle, which may be a conventional circular spray head. The adhesive is sprayed at intervals sufficient to retain the wire, and not sprayed when directly over the flexible clips.

After the wire has been placed in a trough or the troughs and sprayed with adhesive, the feeding device is positioned above a terminal. An insertion ram is selectively engaged to insert the wire between the cutting edges of a terminal. As the insertion ram pushes the wire down between the cutting edges, the insulation about the conductive material of the wire is simultaneously cut, and electrical contact is made with the conductive material of the wire. The insertion ram is operated by a pneumatic cylinder incorporated into the feeding device.

A cutting tool is mounted to the housing. The cutting tool is actuated by a pneumatic cylinder. When brought from an open position, straddling the wire, to a closed position, the cutting tool cuts the wire. This cut takes place after the wire is inserted into terminal.

Although use of the feeding device is preferred, these steps of the invention may be performed using other means, including manual insertion of the wire, while still performing the steps of the method that is the present invention.

DETAILED DESCRIPTION OF THE PREFERRED EMBODIMENT

Figure 1:
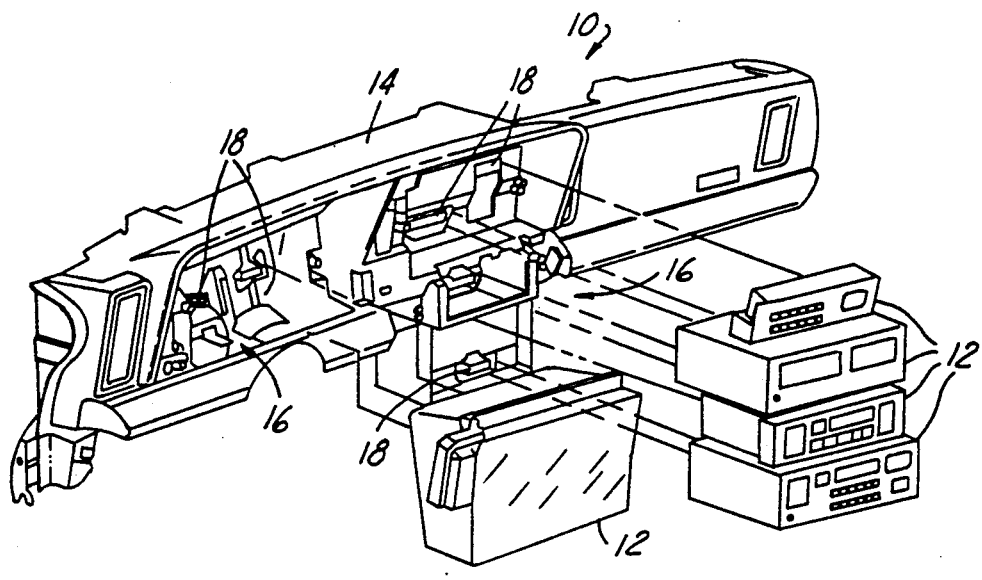
FIG. 1 is a perspective front view of a vehicle instrument panel incorporating the present invention.

Reference is now made to the drawings and, in particular, to FIG. 1, in which the front view of a vehicle instrument panel assembly 10 is seen. The instrument panel assembly 10 includes a plurality of electrical and electronic subassembly components 12 that are associated with the instrumentation displayed on the instrument panel or dashboard of a vehicle. The subassembly components 12 include such disparate electrical and electronic instruments, components, and other assemblies, as an electronic message center, a power antenna, an intermittent windshield wiper control, an electronic air conditioning control, a radio and tape deck, an electronic voice alert, an illuminated entry relay, a fuse box and other gauges, components, and switches known to those of ordinary skill in the automotive arts. The subassembly components 12 are mounted on or in proximity to a dashboard structure 14.

The subassembly components 12 are each assembled into a structural and electrical connection with the instrument panel assembly 10 at associated docking stations 16. The subassembly components 12 are fitted into these docking stations 16, some of which are a part of the dashboard structure 14 of the instrument panel assembly 10. These docking stations 16 are formed into the dashboard structure 14 as wells shaped for respective subassembly components 12. Others of the docking stations 16 are situated to the rear of the vehicle instrument panel 10, as will be disclosed shortly. As will also be explained and as may be viewed from the rear of the vehicle instrument panel 10, each subassembly component docked in a docking station 16 is connected to a connector 18. Each subassembly component 12 has a built-in connector 19 that interfits with a connector 18 situated at each docking station 16.

Figure 2:
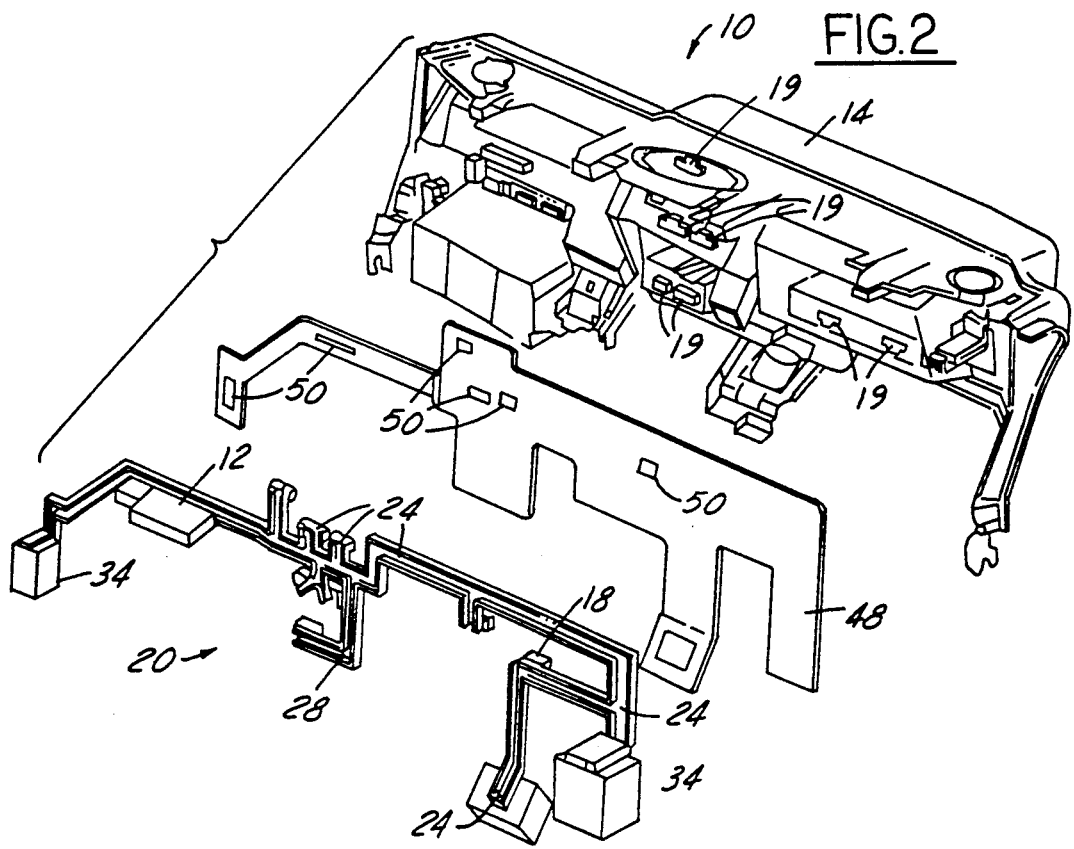
FIG. 2 is a perspective rear view of a vehicle instrument panel incorporating the present invention.

Referring now to FIG. 2, the rear of the vehicle instrument panel assembly 10 is seen. The rear of the vehicle instrument panel assembly 10 exposes a wiring system 20 for vehicle instrument panel wire. Instrument panel assembly 10 includes the dashboard structure 14 and others of the plurality of electrical assembly components 12 that are associated with the instrumentation displayed on the face of the dashboard. The subassembly components 12 are interconnected and/or connected to other electrical and electronic components by a plurality of wires 22 attached to the connectors 18 that interfit with the connectors 19 of the subassembly components 12 and other electrical components to be disclosed.

Figure 3:
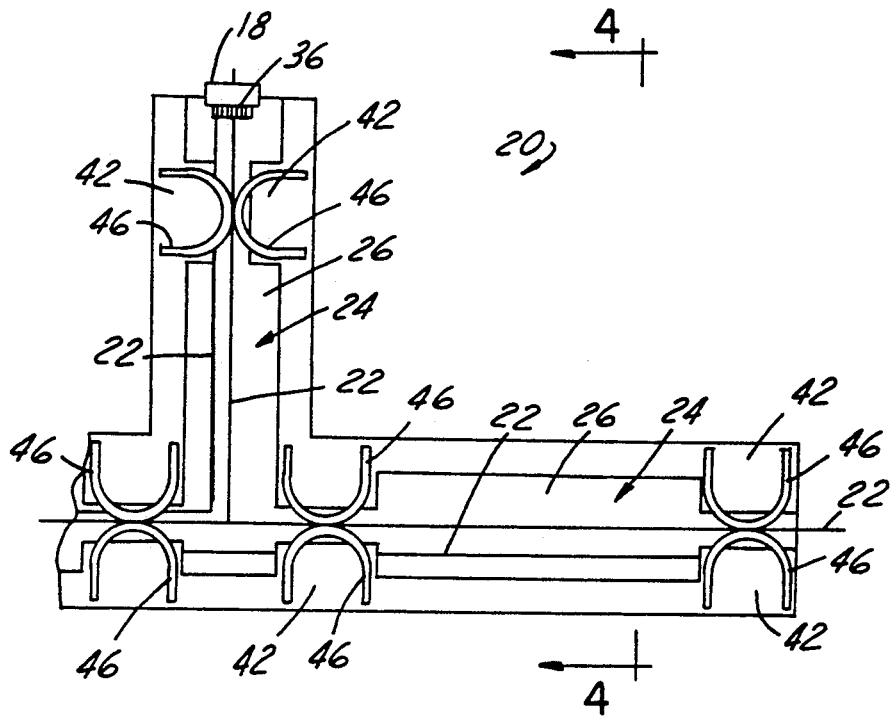
FIG. 3 is a fragmentary plan view of a wiring system for vehicle instrument panel wire in accordance with the present invention.
Figure 4:
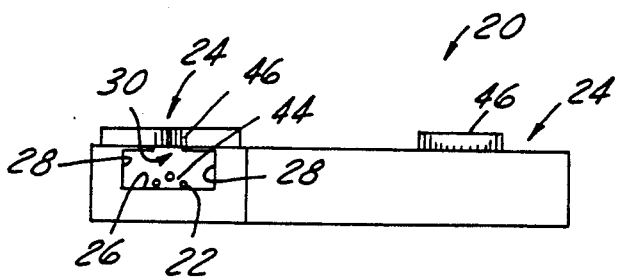
FIG. 4 is a cross-section of the wiring system of FIG. 3 taken in the direction of arrows 4—4 of FIG. 3.
Figure 5:
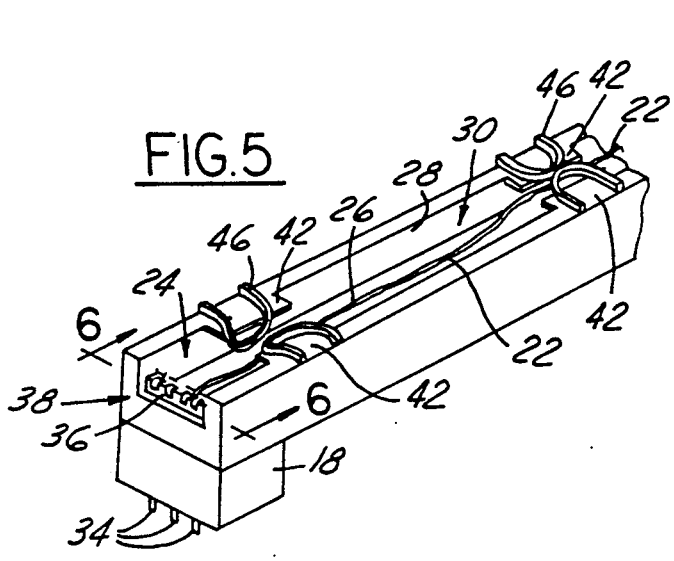
FIG. 5 is a fragmentary perspective view of a trough of the wiring system of FIGS. 3 and 4 in accordance with the present invention.

Referring still to FIG. 2, but now with the aid of FIGS. 3-5, the wiring system 20 comprises a series of walled channels or troughs 24, with wires 22 shown routed within the series of channels or troughs 24. Each trough 24 is defined by a floor 26 extending along a longitudinal axis. It is to be appreciated that the nomenclature "floor" has been chosen for purposes of relative orientation of structural parts of a trough 24. It is to be further appreciated that in normal use, a trough 24 may be orientated so that the floor 26 of the trough 24 is generally parallel to a vertical plane. In accordance with this convention, with regard only to the wiring system 20, which comprises troughs 24, the floor will be treated as if it were "below" the "ceiling" of the trough 24, as the ceiling will be later defined.

Two side walls 28 extend, perpendicularly to and upwardly, that is, outwardly away from the floor 26. The side walls 28 are laterally spaced to define the width of the trough 24. Opposite the floor 26, in accordance with the U-channel-like cross-section of the trough 24, is an open ceiling 30 to the trough 24. The open ceiling 30, as it is defined to be opposite the floor 26, extends the length of the floor 26 along the longitudinal axis of the trough 24. The open ceiling 30 is bounded by the edges of the walls 28 disposed outwardly from the floor 26 or the innermost edges of ledges 32, which will later be described as an optional feature of a means for restraining wires 22 within trough 24.

Each trough 24 may be traced along its longitudinal extent to other troughs or groups of troughs. This allows for branching of the troughs 24, so that the wires 22 may be laid out in the troughs 24 to trace circuits that connect with subassembly components 12 and/or into other troughs 24 in which wires 22 are traceable to connectors 18 that interfit with subassembly component connectors 19. The connectors 18 that interfit with the subassembly component connectors 19 are structurally and electrically incorporated into the wiring system 20. Each connector 18 serves the mating portion for the connector 19 of a subassembly component 12. The mating portion of each connector 18 is typically oriented toward a docking station 16 associated with the instrument panel assembly 10 for ease of access and connection. The connectors 18 are "floating" connectors as are known by those of ordinary skill in the art.

Each trough 24 has a finite length and extends in a path in an axial direction and may extend into a plurality of branches of troughs 24, with each branch extending in a different axial direction depending on the location of the subassembly components 12 that are docked into the wiring system 20. Each trough 24 may contain one or several wires 22 or as many as two-hundred wires 22. The size of a trough 24 may be different from another trough 24, depending on the number of wires 22 to be placed in the trough 24. In the preferred embodiment, most wires 22 originate from left and right body wiring modules 34, function as small on-board computers coacting with the subassembly components 12.

Figure 6:
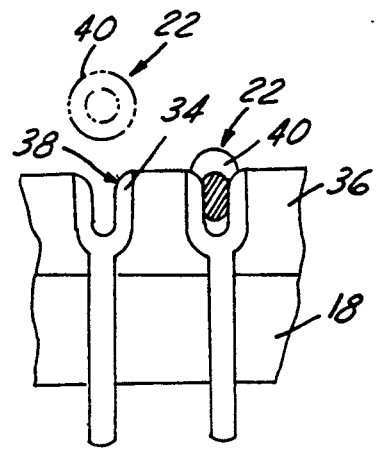
FIG. 6 is a fragmentary cross-sectional view taken in the direction of arrows 6—6 of FIG. 5.

Each of the left and right body wiring modules 34 and each connector 18 is attached to a plurality of terminals 36, each terminal 36 providing an electrical connection for a single wire 22. The plurality of terminals include trough terminals 36 that are attached to the troughs 24. Preferably, several terminals 36 and a connector 18 are integral as one unit that includes a housing 37 insulating the terminals 36. The terminals 36 are insulation displacement terminals. As is known in the art, these terminals 36 have cutting edges 38 that cut through the insulation 40 of a wire 22, as shown in FIG. 6, when a wire 22 is forced down into the slot between cutting edges 38 of a terminal 36. Each terminal 36 extends to a electrical contacting part of a connector 18, again as is known in the art.

Each wire 22 is restrained within the trough 24 by restraining means made up of a number of component parts, all of which are not necessarily required in a single embodiment of the present invention. Included among the number is the ledge 32 extending from each side wall 28. Another is an adhesive 44 (shown particularly in FIG. 4), which is used to attach a wire 22 to the floor 12 of a trough 24. The adhesive 44 may be placed on the wire 22 or floor 26 in a variety of ways, such as by spreading adhesive 44 by a brush or the like or, preferably, by selectively spraying the adhesive 44 onto each wire 22 as the wire 22 is placed in a trough 24.

With reference now particularly to FIGS. 3-5, yet another component of the restraining means is seen to comprise a pair of flexible clips 46 that are mounted over open ceiling 30 of trough 24. The pairs of flexible clips 46 are disposed in spaced relationship to other pairs of flexible clips 46 along the extension of each trough 24. The intervals of the spaced relationship are sufficient such that clips 46 restrain wires 22 within trough 24, whether or not the wires 22 are attached to the floor 26 of the trough 24 or restrained within the trough 24 by other means. A preferred measurement would have the pairs of flexible clips 46 spaced between six and twelve inches apart. Additionally, the pairs of flexible clips are to be mounted before and after each branching trough or troughs 24 into another trough 24 or other troughs 24, so that pairs of flexible clips are mounted at the beginning and end of the extent of a particular trough 24.

Each pair of flexible clips 46 cantilevers from either side of trough 24 at the outer most extent of a wall 28 from floor 26. The ledges 42 may serve to support the flexible clips 46 as they cantilever over the open ceiling 30. Each flexible clip 46 bows out to roundedly engage an opposing clip 46. Accordingly, each clip 46 is in contact with an opposing clip 46 to provide an obstruction over open ceiling 30, thereby restraining wires 22 beneath the opposing pair of flexible clips 46. Each flexible clip 46 may be temporarily displaced to flex its rounded portion (the portion that engages the rounded portion of an opposing clip 46) away from the said opposing clip 46, so that each clip 46 is separated from the opposing flexible clip 46. Accordingly, displacement of flexible clips so that they are not in contact with one another in a paired arrangement opens open ceiling 30 of trough 24 to allow a wire 22 to be inserted into trough 24. The clips 46, when so displaced rebound to engage one another over open ceiling 30 of a trough 24, so that the newly inserted wire 22 is retained beneath opposing clips 46. Preferably, in order to provide the characteristics of flexibility and resiliency, the flexible clips 46 are made of a low density polyethylene.

With reference yet again to FIG. 2, in accordance with the structure just described for the preferred embodiment of the present invention, the wiring system 20 may used in conjunction with a wiring board 48 to provide structural integrity for the wiring system 20. The wiring board 46 may be of any suitable low weight, semirigid material such as a pressed cardboard. Openings 50 are provided in the wiring board 48 so that the connectors 18 have thru access to the socking stations 16 for connection with the subassembly component connectors 19. The troughs 24 are attached to the wiring board 48 by adhesive or other connecting devices, such as screws, known in the art. Alternatively, troughs 24 may be manufacture integrally into wiring board 48, particularly if wiring board 48 is made of a molded material such as plastic. In such case, the troughs 24 may be recessed into the wiring board 48. The wiring board 48 may then be attached to the instrument panel assembly 10 screws, clips or other known fasteners.

Figure 7:
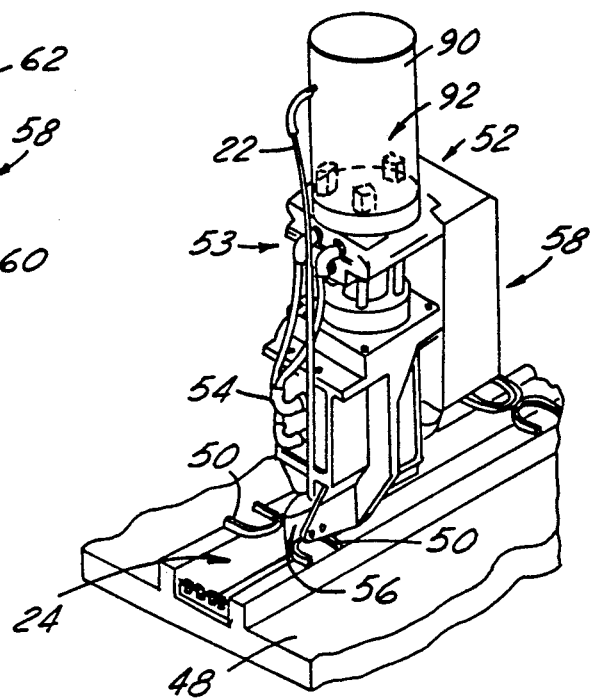
FIG. 7 is a perspective rear view of a wire feeding machine.

Referring now to FIG. 7, a wire feeding device 52 is used to place a single wire 22 within a trough 24. The feeding device 52 includes a housing to which various functional elements used in feeding and restraining wires 22 and interacting with the wiring system 10 may be attached. Wire 22 is supplied from a spool of wire (not shown) external to the feeding device 52. A trailing end of the wire 22 is initially anchored at an originating terminal 36. The wire 22 is then threaded through a wire feed tube 54 mounted to the housing. As the feeding device 52 traverses a path tracing selected ones of the troughs 24 of the wiring system 10, the wire 22 is continuously fed through the feeding device 52. The spool of wire may be changed to hold different types of wire, as required. Some types of wire may not slide as easily through the wire feed tube 54 and may need the assistance of a motorized mechanism to unwind the spool to feed wire 22 to the feeding device 52.

A clip separator or wedge 56 is mounted to the housing of the wire feeding device 52 and functions to separate flexible clips 46, providing access to trough 24 for feed tube 54. The wedge 56 functions to move aside the flexible clips 46 as it passes or "wedges" between them. Accordingly, each flexible clip 46 is moved from a first position over the opening to trough 24 where clip 46 is bowed into engagement with or proximity to another opposingly bowed clip, to second position where the clip is flexed away from its engagement with or proximity to the other opposingly bowed clip 46. It is the flexibility of the clips 46, that allows the wedge 56 of the wire feeding device 52 to pass freely between the clips 46. Once the wire 22 has passed between opposing clips 46, having laid wire 22 in a trough 24, the flexible clips 46 return to their original unflexed posture and the wire 22 is left restrained in trough 24 by the clips 46. After the wire 22 is under the flexible clips 46, the feeding device 52 proceeds along a trough 24 and then on to different branches of troughs 24.

Figure 8:
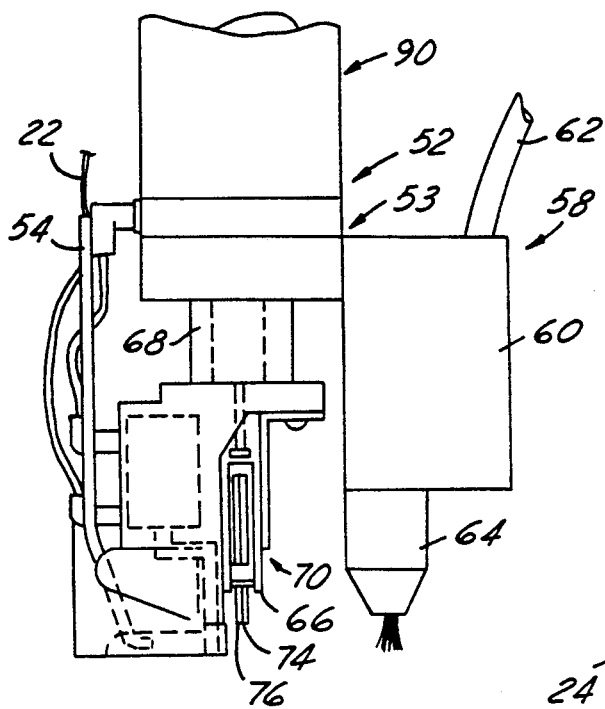
FIG. 8 is an elevation of the wire feeding machine of FIG. 7.

As the wire 22 is placed in the trough 24, a spray applicator 58 applies adhesive 44 to assist in securing the wire 22 in the trough 24. With reference to FIGS. 7 and 8, the spray applicator 58 includes a pumping mechanism (not shown), an applicator housing 60 and a hose 62 for supplying adhesive 44 from the applicator housing 60, to a spray nozzle 64. The applicator housing 60 is mounted externally to the feeding device 52, and the mechanism within it selectively pumps adhesive 44 through the nozzle 64. The nozzle 64 is spaced from floor 36 of the trough 24. The adhesive 44 that the spray applicator 58 applies is preferably a hot melt glue. The glue is pumped through the hose 62 to the spray nozzle 64, which may be a conventional circular spray head.

The adhesive 44 is sprayed at intervals sufficient to retain the wire 22, and not sprayed when directly over flexible clips 46.

Although use of the feeding device 52 is preferred, these steps of the invention may be performed using other means, including manual insertion of the wire 22, while still performing the steps of the method that is the present invention.

After a wire 22 has been placed in a trough or the troughs 24 and sprayed with adhesive 44, the feeding device 52 is positioned above a terminal 36. An insertion ram 66 is selectively engaged to insert the wire 22 between the cutting edges 38 of a terminal 36. As the insertion ram 66 pushes the wire 22 down between the cutting edges 38, the insulation 40 about the conductive material of the wire 22 is simultaneously cut, and electrical contact is made with the conductive material of the wire 22. The insertion ram 66 is operated by a pneumatic cylinder 68 incorporated into the feeding device 52, as shown in FIG. 5.

Figure 9:
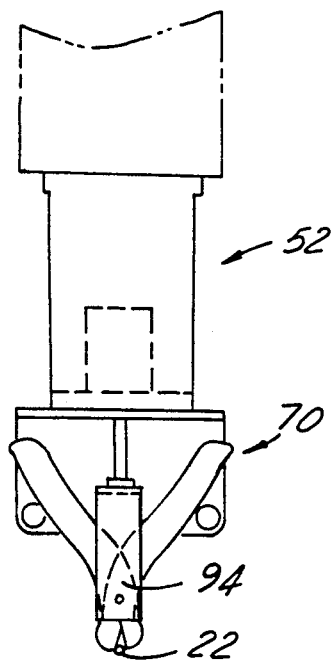
FIG. 9 is a view of a cutting device on the wire feeding machine of FIGS. 7 and 8, with the cutter jaws open.
Figure 10:
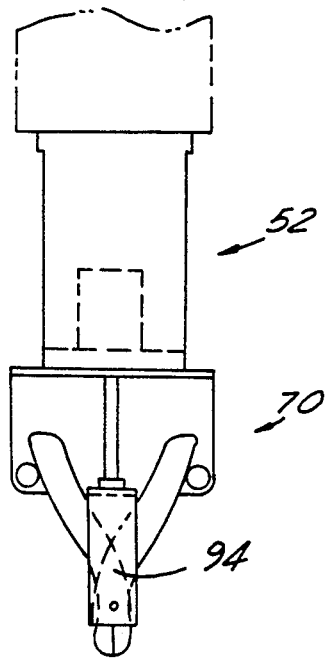
FIG. 10 is a view of a cutting device on the wire feeding machine of FIGS. 7 and 8, with the cutter jaws closed.

As may be seen in FIGS. 9 and 10, a cutting tool 70 mounted to the housing of the wire feeding device 52. The cutting tool 70 is actuated by a pneumatic cylinder 94. The cutting tool 70 is seen in FIG. 9 in an open position, and in FIG. 10 in a closed position. When brought from an open position, straddling the wire 22, to a closed position, the cutting tool 70 cuts the wire 22. This cut takes place after the wire 22 is inserted into terminal 36.

Preferred steps in the method of the present invention have been disclosed. A worker of ordinary skill in the art would realize, however, that certain modifications of this invention would be obvious from the teachings of this application. Thus, the following claims should be studied in order to determine the true scope and content of the invention.

What is claimed is:

1. A method of feeding and restraining wire for a vehicle instrument panel, the wire being fed into and restrained in a system of troughs attached to a structure serving as a wiring board, each trough having a floor and two substantially parallel side walls perpendicular to said floor and extending upwardly from said floor to an open ceiling defined by its boundaries formed by said walls, the system of troughs having at least two terminals disposed remotely from one another, the method comprising the steps of:
   attaching one end of a first wire to a first terminal within a first trough;
   laying said first wire to trace the extension of said first trough;
   spraying said first wire at intervals with adhesive to attach said wire to the floor of said trough;
   cutting said first wire at the location of the second terminal; and
   attaching the wire to the second terminal.

2. The method recited in claim 1, further comprising the steps of repeating said steps of attaching an end of a wire, laying, spraying, cutting and attaching said wire, wherein said wire in the steps of repeating said steps is a second wire.

3. The method recited in claim 1, wherein resiliently flexible clips span across said open ceiling and said laying step includes the sub-step of flexing said flexible clips to move then from over the opening to allow the wire to be laid and releasing said clips to allow them to rebound over said open ceiling retaining the wire with said trough.

4. The method recited in claim 1, wherein said second terminal is a displacement terminal and said attaching step includes the step of ramming said wire in said displacement terminal, whereby said terminal electrically contacts said terminal cutting through the insulation of said wire.

5. The method recited in claim 4, wherein said cutting step precedes said step of attaching the wire to the second terminal.

6. The method recited in claim 5, further comprising a feeding step of unrolling said wire from a spool of wire as said laying step is performed.

7. The method recited in claim 6, wherein said second terminal is a displacement terminal and said attaching step includes the step of ramming said wire in said displacement terminal, whereby said terminal electrically contacts said wire by said terminal cutting through the insulation of said wire.

8. The method recited in claim 7, wherein said cutting step precedes said step of attaching the wire to the second terminal.

9. The method recited in claim 8, further comprising a feeding step of unrolling said wire from a spool of wire as said laying step is performed.

10. The method recited in claim 9, wherein resiliently flexible clips span across said open ceiling and said laying step includes the sub-step of flexing said flexible clips to move them from over the opening to allow the wire to be laid and releasing said clips to allow them to rebound over said open ceiling retaining the wire with said trough.

11. A method of feeding and restraining wire for a vehicle instrument panel, the wire being fed into and restrained in a system of troughs attached to a structure serving as a wiring board, each trough having a floor and two substantially parallel side walls perpendicular to said floor and extending upwardly from said floor to an open ceiling defined by its boundaries formed by said walls, resiliently flexible clips spanning across said open ceiling, the system of troughs having at least two terminals disposed remotely from one another, the method comprising the steps of:

attaching one end of a first wire to a first terminal within a first trough;

laying said first wire to trace the extension of said first trough including flexing said flexible clips to move them from over the opening to allow the wire to be laid and releasing said clips to allow them to rebound over said open ceiling to retain the wire within said trough;

spraying said first wire at intervals with adhesive to attach said first wire to the floor of said trough;

cutting said first wire at the location of the second terminal; and attaching the first wire to the second terminal.

12. The method recited in claim 11, further comprising the steps of repeating said steps attaching, laying, spraying, cutting and attaching said wire to the second terminal, wherein said wire is a second wire.

13. The method recited in claim 11, wherein said second terminal is a displacement terminal and said attaching step includes the step of ramming said wire in said displacement terminal, whereby said terminal is electrical contact by said terminal cutting through the insulation of said wire.

14. The method recited in claim 13, wherein said cutting step precedes said step of attaching the wire to the second terminal.

15. The method recited in claim 14, further comprising a feeding step of unrolling said wire from a spool of wire as said laying step is performed.

16. The method recited in claim 15, wherein said second terminal is a displacement terminal and said attaching step includes the step of ramming said wire in said displacement terminal, whereby said terminal is electrical contact by said terminal cutting through the insulation of said wire.

17. The method recited in claim 16, wherein said cutting step precedes said step of attaching the wire to the second terminal.

18. The method recited in claim 17, further comprising a feeding step of unrolling said wire from a spool of wire as said laying step is performed.

* * * * *